United States Patent

Sugiyama et al.

[15] 3,636,458
[45] Jan. 18, 1972

[54] PERIODIC AVERAGING CIRCUIT

[72] Inventors: Takashi Sugiyama; Satoshi Kurata; Keiki Yamaguchi, all of Tokyo, Japan

[73] Assignees: Kabushikikaisha Yokogawa Denki Seisakusho (Yokogawa Electric Works, Ltd.), Tokyo, Japan

[22] Filed: Dec. 3, 1969

[21] Appl. No.: 881,840

[30] Foreign Application Priority Data

Dec. 6, 1968  Japan..................................43/89838

[52] U.S. Cl...............................328/151, 307/238, 328/127
[51] Int. Cl. .......................................................H03k 5/00
[58] Field of Search ..................307/238, 229, 230; 328/151, 328/127

[56] References Cited

UNITED STATES PATENTS

| 3,129,326 | 4/1964 | Balaban..................................307/229 |
| 3,130,325 | 4/1964 | Rubin et al. ............................307/229 |
| 3,480,795 | 11/1969 | Benson et al........................328/151 X |
| 3,011,129 | 11/1961 | Magleby et al. .........................328/151 |

Primary Examiner—Donald D. Forrer
Assistant Examiner—B. P. Davis
Attorney—Hill, Sherman, Meroni, Gross & Simpson

[57] ABSTRACT

A periodic averaging circuit having an integrator supplied with an input signal, a sampling hold circuit supplied with the output of the integrator and a sampling pulse, and a feedback circuit for feeding the output of the sampling hold circuit back to the integrator, the sampling hold circuit holding the output of the integrator in accordance with the sampling pulse applied thereto.

5 Claims, 10 Drawing Figures

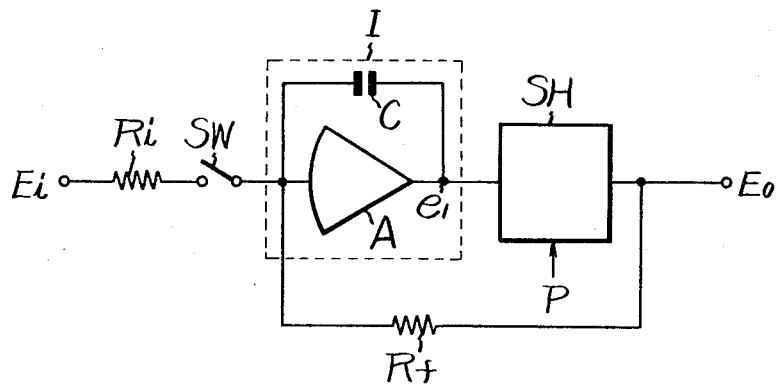
Fig. 1
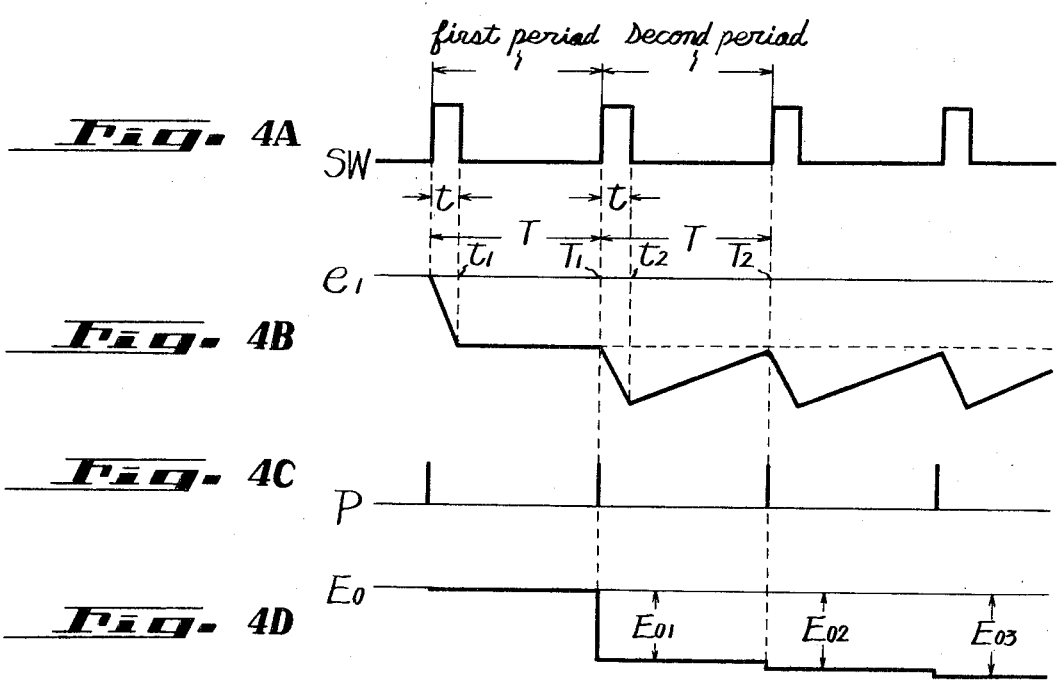
Fig. 4A
Fig. 4B
Fig. 4C
Fig. 4D
INVENTORS
Takashi Sugiyama
Satoshi Kurata
Keiki Yamaguchi
BY                    ATTYS.

INVENTORS
Takashi Sugiyama
Satoshi Kurata
Keiki Yamaguchi

BY
ATTYS.

PERIODIC AVERAGING CIRCUIT

BACKGROUND OF THE INVENTION

1. Field of the Invention

This invention relates to a periodic averaging circuit adapted so that an electric input signal is averaged for every predetermined period to produce an output signal.

2. Description of the Prior Art

There has heretofore been proposed a circuit for averaging an electric input signal for every predetermined period which is of the type that integration of an input signal, holding and resetting of the integrated value are achieved by the use of an integrator for every period. However, its output signal is reduced to zero by every resetting to cause great pulsation and hence this conventional circuit is inconvenient in practical use.

SUMMARY OF THE INVENTION

The present invention has for its object the provision of an electric signal averaging circuit which is free from the defect experienced in the prior art and by which an input signal is averaged for every predetermined period to produce a signal with no unnecessary pulsation.

BRIEF DESCRIPTION OF THE DRAWINGS

FIG. 3 is a block diagram showing one embodiment of a time-division potentiometer to which this invention is applied;

FIGS. 4A–4D are a series of waveforms for explaining the operation of the device exemplified in FIG. 3;

DESCRIPTION OF THE PREFERRED EMBODIMENTS

Figure 1:
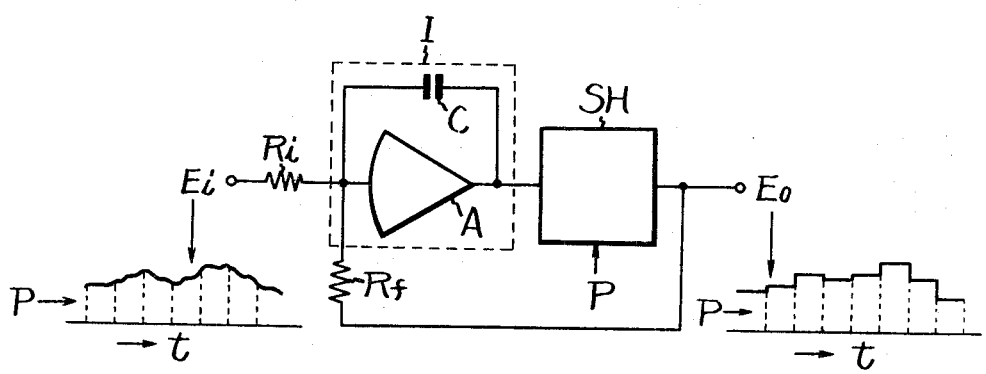
FIG. 1 schematically shows a fundamental circuit construction of this invention.

In FIG. 1 there is schematically illustrated a basic circuit construction of a periodic averaging circuit of this invention. Reference character I indicates an integrator which consists of an operational amplifier A and an integrating capacitor C and in which the output of the operational amplifier A is negatively fed back thereto through the capacitor C. The integrator I is supplied with an input signal voltage $Ei$ through an input resistor $Ri$. One example of the waveform of this input $Ei$ is shown at the left-hand side of the figure. Reference character SH designates a sampling hold circuit, to the input side of which is supplied the output of the integrator I. The sampling hold circuit SH holds the output of the integrator I at every arrival of a sampling pulse P to produce an output signal voltage $Eo$. One example of the waveform of this output signal $Eo$ is shown at the right-hand side of the figure. The resulting output signal voltage $Eo$ is negatively fed back to the input terminal of the integrator I through a resistor $Rf$.

A description will hereinafter be given of the operation of the circuit thus constructed. Assume that the input signal voltage $Ei$ contains irregular fluctuating components as illustrated and that the sampling time of the sampling hold circuit SH is as indicated by broken lines. Where the integrator I integrates such an input signal for the first time and its output is applied to the sampling hold circuit SH, the sampling hold circuit SH is driven by the sampling pulse P to hold the output of the integrator I at that time, producing the output signal voltage $Eo$. The resulting output signal voltage $Eo$ is fed back to the input terminal of the integrator I through the resistor $Rf$, so that the integrator I is caused to integrate the difference between the input signal voltage $Ei$ and the feedback voltage, that is, the previous integrated value. As a result of this, at the subsequent sampling time the sampling hold circuit SH is supplied with an output of an integrator I which is different from the previous one by a value resulting from such an integration, and this output is held to provide a new output signal voltage and feedback voltage. The same operation is repeatedly carried out and the integrator I integrates a difference between the integrated value of the input signal in the previous period and an instantaneous value of the input signal in the subsequent period during the intervals between the sampling times. Consequently, the sampling hold circuit SH produces the output signal voltage $Eo$ in a stepwise form in which the input signal voltage $Ei$ has been averaged for every sampling operation. The resulting output signal voltage $Eo$ varies step by step depending upon the difference between the mean values of the input signal voltage $Ei$ obtained by the sampling and integrating operations, so that the output signal voltage $Eo$ does not include any unnecessary pulsation such as encountered in the output signal obtainable with the prior art circuit whose output is reduced to zero at every operation.

With the use of such a circuit of this invention, it is possible to remove from the input signal a ripple component superimposed thereon and hence reproduce the initial waveform of the input signal. Namely, in the event that the ripple superimposed on the input signal has a constant frequency as in the case of, for example, a power source ripple component, the ripple component can be completely removed from the input signal by selecting the sampling period to be an integral multiple of the period of the ripple. Further, where the input signal is a high-frequency signal whose repetitive waveform is incomplete due to superimposition of irregular noise, its original waveform can be reproduced by the following method.

Figure 2:
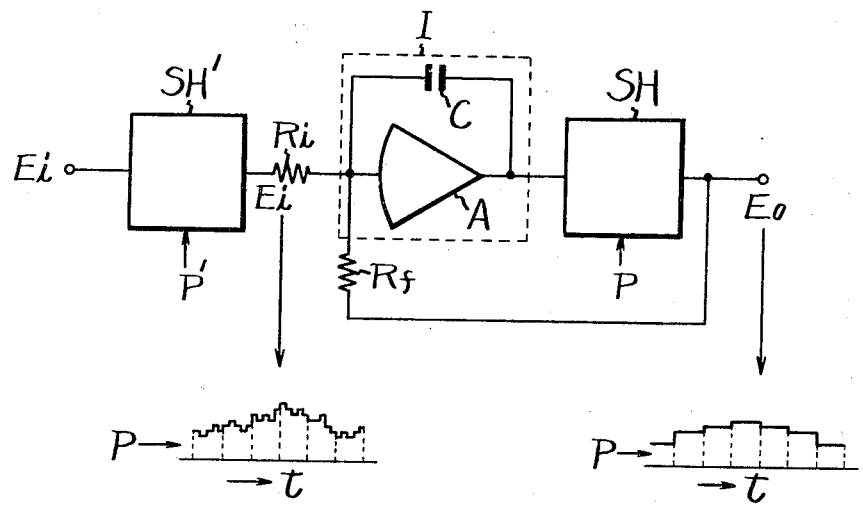
FIG. 2 is a schematic circuit diagram showing a modified form of this invention.

Generally, sampling art for the conversion of a high-frequency repetitive signal into a low-frequency signal is well known but this is possible only with repetitive signals of complete waveforms. In case of a repetitive signal of an incomplete waveform which contains noise signals, its sampled values vary at every sampling operation, making it impossible to reproduce the original waveform. It is possible, however, to obtain original waveform by averaging several sampled values at respective sampling points, so that the input signal can be successively reproduced in its original form by obtaining the mean value of the sampled values on the input signal waveform. A circuit for this operation is of such a construction as depicted in FIG. 2, in which similar elements to those in FIG. 1 are indicated by the same reference characters. The illustrated example employs another sampling hold circuit $SH'$, which is provided at a stage preceding the averaging circuit of FIG. 1, for example, the resistor $Ri$ and by which some of the sampled values which should be equal on the input signal waveform are selected to sequentially move the sampling point, with the result that the input signal $Ei'$ to the integrator I becomes superimposed with small stepwise fluctuating components as depicted in FIG. 2, thus finally producing an averaged output signal $Eo$ such as shown at the right-hand side of FIG. 2.

Thus, the present invention provides an averaging circuit which does not produce any unwanted pulsation in the output signal. Since the integrator in this invention circuit does not require resetting and holding means, the circuit construction can be simplified and, further, the negative feedback to the integrator performs the same function as the resetting thereof at every integration, thereby to lessen the influence of the drift of the integrator.

FIG. 3 is a block diagram showing one example of the averaging circuit of this invention as applied to a time-division potentiometer, in which similar elements to those in FIG. 1 are marked with the same reference characters. In the illustrated example a switch SW is interposed between the input end of the integrator I and the resistor $Ri$ and a constant DC voltage is applied as an input signal voltage $Ei'$ to the integrator I through the switch SW and the input resistor $Ri$. The other circuit construction and arrangement are substantially the same as those of the example shown in FIG. 1.

Referring to FIG. 4, a description will hereinbelow be given of the operation of such a circuit. For convenience of explanation, let it be assumed that the integrator I and the sampling hold circuit SH both start to operate from their initial value 0 and that the switch SW turns on and off at a repeating period T and remains in the on state for a time $t$, as illustrated in FIG. 4A. In the first period the constant DC voltage E$i$ is applied to the input end of the integrator I for the time $t$ during which the switch SW is in the on state. Since an output DC voltage E$o$ of the sampling hold circuit SH is zero in the first period, the integrator I integrates only the constant DC voltage E$i$ for the time $t$ during which the switch SW remains in the on state. Consequently, the output voltage $e_1$ of the integrator I varies as shown in FIG. 4B and the output voltage $e_1$ after the elapse of the time $t$, that is, at a time $t_1$ is as given by the following equation (1).

$$e_1 = (t_1/CRi) \cdot Ei \quad (1)$$

The sampling hold circuit SH is driven by a sampling pulse P generated in synchronism with the on-off operation of the switch SW as illustrated in FIG. 4C and holds the output voltage $e_1$ of the integrator I at the end $T_1$ of the off state of the switch SW, producing such an output DC voltage E$o$ as shown in FIG. 4D at the output end of the circuit SH. Further, the output DC voltage E$o_1$, which is produced at the end $T_1$ of the off state of the switch SW, is negatively fed back to the input end of the integrator I. Accordingly, the output DC voltage E$0_1$ of the first period of the on-off operation of the switch SW is expressed by the following equation (2).

$$Eo_1 = (t_1/CRi) \cdot Ei \quad (2)$$

In the second period of the on-off operation of the switch SW, the output DC voltage $Eo_1$ expressed by the equation (2) is negatively fed back to the input end of the integrator I, so that the integrator I integrates the input voltage E$i$ for the time $t$ during which the switch SW is in the on state as in the first period and, at the same time, the aforementioned feedback voltage $-Eo_1$ is added to the input voltage and integrated in the repeating period T of the switch SW. Consequently, the output voltage $e_1$ of the integrator I varies in such a manner as to undergo an increase from the starting point $T_1$ of the second period of the switch SW to the terminating point $t_2$ of its on state and a decrease from the time $t_2$ to the terminating point $T_2$ of the second period as shown in FIG. 4B. When the output voltage $e_1$ of the integrator I at the end of the second period is held for sampling, the resulting output DC voltage $Eo_2$ is given by the following equation (3).

$$Eo_2 = \frac{t}{CRi}Ei + \left(\frac{t}{CRi}Ei - \frac{tT}{C^2RiRf}Ei\right) = \frac{tEi}{CRi}\left(2 - \frac{T}{CRf}\right) \quad (3)$$

In a similar manner, an output DC voltage $Eo_3$ at the end of the third period of the switch SW is expressed by the following equation (4).

$$Eo_3 = \frac{tEi}{CRi}\left\{\left(2 - \frac{T}{CRf}\right) + \left(1 - \frac{T}{CRf}\right)^2\right\} \quad (4)$$

If $T/CRf$ is selected to be as equal to 1 as possible in the equations (3) and (4) and $T/CRf + \Delta = 1$ ($\Delta<<1$), an output DC voltage $Eo_n$ of the $n$th period of the switch SW is given by the following equation (5).

$$Eo_n = Eo_1(1 + \Delta + \Delta^2 + \ldots + \Delta^{n-1})$$
$$= Eo_1 \cdot (1 - \Delta^n/1 - \Delta) \quad (5)$$

Accordingly, it follows that $$Eo_n = (t/CRi)Ei \cdot (CRf/T)(1 - \Delta^n)$$
$$= (Rf/Ri) \cdot (t/T) \cdot Ei(1 - \Delta^n) \quad (6)$$

As will be apparent from the equation (6), the output DC voltage E$o$ is converged to a value of $(Rf/Ri \cdot t/T \cdot Ei)$ at a precision of $\Delta^n$ in the $n$th period of the switch SW. If $T/CRf=1$, the output DC voltage E$o$ is converged to a ripple-free DC voltage only in one period of the switch SW.

As will be seen from the equation (6), if the values of the input resistor $Ri$ and the feedback resistor $Rf$ are selected to be constant, the output DC voltage E$o$ is in proportion to the ratio $t/T$ between the conducting time and the repeating period of the switch SW. Namely, the device exemplified in FIG. 3 might be said to be a potentiometer in which the constant DC voltage E$i$ is divided at the rate of $t/T$.

Figure 5:
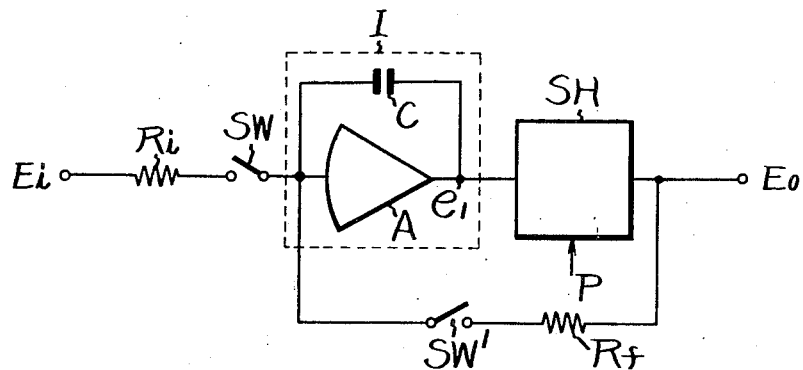
FIG. 5 and 6 are block diagrams, similar to FIG. 3, illustrating other embodiments of the time-division potentiometer to which this invention is applied.

In FIG. 5 there is illustrated a modified form of the time-division potentiometer to which has been applied the averaging circuit of this invention, in which the same reference characters as those in FIG. 3 indicate similar elements. In the present example the output DC voltage E$o$ of the sampling hold circuit SH is negatively fed back to the input side of the integrator I through the feedback resistor $Rf$ and a switch SW'. The switch SW' is adapted to be turned off in synchronism with the sampling pulse P for driving the sampling hold circuit SH. In the example of FIG. 3 in which the output DC voltage E$o$ is always fed back to the input side of the integrator I without the provision of the switch SW', when the sampling pulse width is finite, a circuit consisting of the integrator I, the sampling hold circuit SH and the resistor $Rf$ constitutes a closed loop, so that the output of the potentiometer is likely to be vibratory. While, with the insertion of the switch SW' controlled in synchronism with the sampling pulse in the closed loop as depicted in FIG. 5, the output of the potentiometer does not vibrate, even if the sampling pulse width is finite.

With the arrangements of FIGS. 3 and 5, it is possible to provide a time-division potentiometer in which the voltage-dividing ratio is determined by the conducting time of the switch SW to minimize the ripple component of the output DC voltage and the response time is short.

Figure 6:
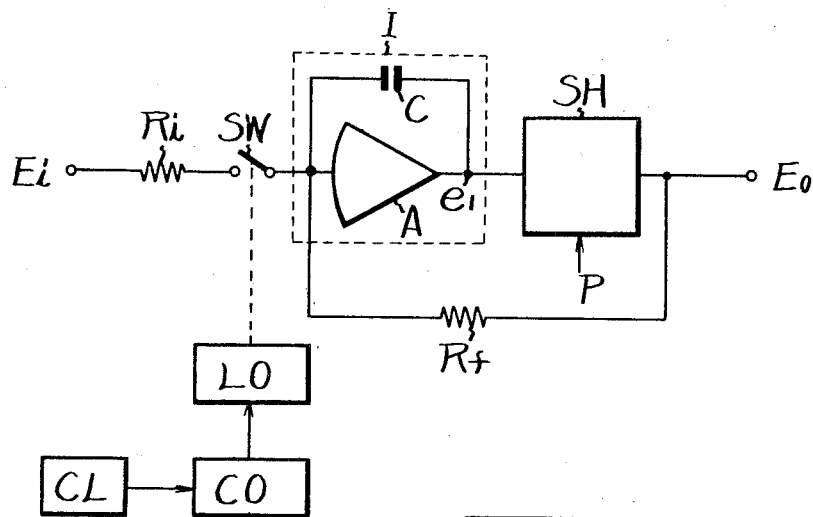

FIG. 6 shows in block form a further modification of the time-division potentiometer to which has been applied the averaging circuit of this invention, in which similar elements to those in the foregoing examples are indicated by the same reference characters. In the figure, reference character CL a clock pulse generator, CO a pulse counter and LO a logic circuit, which logic circuit LO is supplied with a digital code signal representative of a voltage-dividing ratio and compares the code signal with a counted value of the pulse counter CO to produce a signal for driving the changeover switch SW at a predetermined voltage-dividing ratio of, for example, $n/N$.

The changeover switch SW is interposed between the input terminal of the operational amplifier A and the input terminal to which the constant DC voltage E$i$ is impressed. The output terminal of the clock pulse generator CL is connected to the input terminal of the pulse counter CO, the output terminal of which is, in turn, connected to the input terminal of the logic circuit LO. The changeover switch SW is driven by the output signal of the logic circuit LO.

A description will be given of the operation of the time-division potentiometer to which has been applied the averaging circuit of this invention constructed as above described.

The pulse counter CO counts the output pulses of the clock pulse generator CL and when the counted value exceeds a predetermined value (for example, N count), the counted value is reset to zero and the counter CO again initiates counting from zero. The code signal of the counted value of the pulse counter CO is impressed to the logic circuit LO. The logic circuit LO is supplied with a digital code signal $n(n<N)$ indicative of the voltage-dividing ratio and compares the value of the impressed code signal with the counted value of the pulse counter CO to detect a time when the both values agrees with each other and produces a signal for driving the changeover switch SW in accordance with the detected result. Namely, the switch SW is driven by the logic circuit LO at the ratio $n/N$ between the capacity N of the pulse counter CO and the established value $n$ of the logic circuit LO.

In practice, the logic circuit LO is made up of a decimal to binary converter switch or a shift resistor. Since the voltage-dividing ratio of the time-division potentiometer of FIG. 6 is determined only by the value $n$ established in the logic circuit LO with the digital signal and the counting capacity N of the pulse counter CO, the potentiometer does not need any adjustment and any contact. Further, the potentiometer includes only the amplifier and the changeover switch whose characteristics vary with temperature and the like, so that a mere selection of stable ones of such elements allows ease in the manufacture of precise and stable potentiometers.

Figure 7:
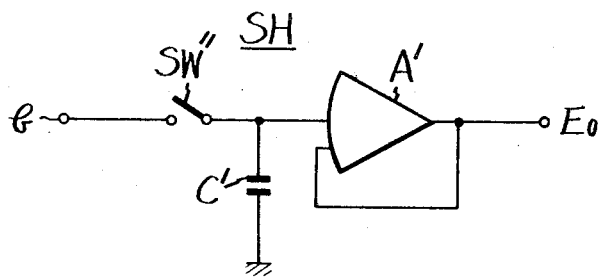
FIG. 7 is schematic diagram showing one example of a sampling hold circuit employed in the above potentiometers.

Referring now to FIG. 7, the sampling hold circuit SH above mentioned will hereinbelow be described by way of example. In the figure the sampling hold circuit SH consists of an operational amplifier A' and a capacitor C' connected to its input side. Reference character *b* indicates an input terminal of the sampling hold circuit SH to which is applied the output of the integrator I and SW'' a switch interposed between the terminal *b* and the operational amplifier A' and driven by the sampling pulse P. The output of the operational amplifier A' is negatively fed back to its input side, if necessary.

The operation of the sampling hold circuit SH is as follows. Assuming that the switch SW'' is closed by the sampling pulse P, the output of the integrator I fed to the input terminal *b* is stored in the capacitor C'. When the switch SW'' is open, the voltage stored in the capacitor C' is held.

It will be apparent that many modifications and variations may be effected without departing from the scope of the novel concepts of this invention.

We claim as our invention:

1. A periodic averaging circuit for a time-division potentiometer comprising a pulse counter for counting clock pulses of a constant period, a logic circuit for comparing the counted value of the pulse counter with a given digital code signal to detect the time of agreement of them, an operational amplifier, and a changeover switch connected to an input circuit of the operational amplifier and driven by the output of the logic circuit to change over an input analog signal, in which a voltage or current signal of a voltage-dividing ratio corresponding to the digital code signal applied to the logic circuit is derived at the output terminal of the operational amplifier.

2. A periodic averaging circuit comprising:
   an integrator having a charge storage means;
   a sampling hold circuit having a second charge storage means and a switch means and being supplied with the output of the integrator;
   a sampling pulse generating means for operating the switch means of said sampling hold circuit; and
   a negative feedback circuit for feeding the output of said sampling hold circuit back to the input side of said integrator, said integrator integrating an input signal supplied thereto and the output signal of the sampling hold circuit which is supplied to said integrator through said negative feedback circuit, said sampling hold circuit sampling and holding the output of said integrator in accordance with the sampling pulse applied to said switch means of said sampling hold circuit to thereby obtain at the output of said sampling hold circuit an output signal containing no undesired pulsations which correspond to said input signal.

3. A periodic averaging circuit for a time-division potentiometer comprising:
   a switching circuit for tuning on and off an input signal;
   an integrator having a charge storage means and connected to said switching circuit;
   a sampling hold circuit having a second charge storage means and a switch means and supplied with the output of said integrator;
   a sampling pulse generating means for operating said switch means of said sampling hold circuit in synchronism with the on-off period of said switching circuit; and
   a negative feedback circuit for negatively feeding the output signal from said sampling hold circuit back to the input side of said integrator, said integrator integrating an input signal supplied thereto and the output signal of said sampling hold circuit supplied thereto through said negative feedback circuit, said sampling hold circuit sampling and holding the output of said integrator in accordance with the sampling pulses applied to said switch means of said sampling hold to thereby obtain at the output of said sampling hold circuit an electrical signal having a voltage-dividing ratio corresponding to the on-off period of said switching circuit.

4. A periodic averaging circuit for a time-division potentiometer as claimed in claim 3 wherein a switch is inserted in said feedback circuit and is adapted to be turned off in synchronism with the sampling pulse for driving said switch means of said sampling hold circuit.

5. A periodic averaging circuit for a time-division potentiometer comprising:
   a pulse counter for counting clock pulses of a constant period;
   a logic circuit for comparing the counted value of the pulse counter with a given digital code signal to detect when they agree;
   a switching circuit for turning on and off an input signal in accordance with the output of said logic circuit;
   an integrator having a charge storage means and an operational amplifier;
   a sampling hold circuit having a second charge storage means and another switch means and connected to the output side of said integrator; and
   a negative feedback circuit for negatively feeding back the output signal of said sampling hold circuit to the input side of said integrator, said integrator integrating the input signal applied thereto through said switching circuit and the output signal of said sampling hold circuit applied thereto through said negative feedback circuit, said sampling hold circuit sampling and holding the output of said integrator in accordance with a sampling pulse applied to said switch means of said sampling hold circuit to thereby obtain at the output of said sampling hold circuit an electrical signal having a voltage-dividing ratio corresponding to the digital code signal applied to said logic circuit.

* * * * *